June 17, 1924.
B. J. DUCE
THREAD CHASING MACHINE
Filed March 5, 1923
1,497,844
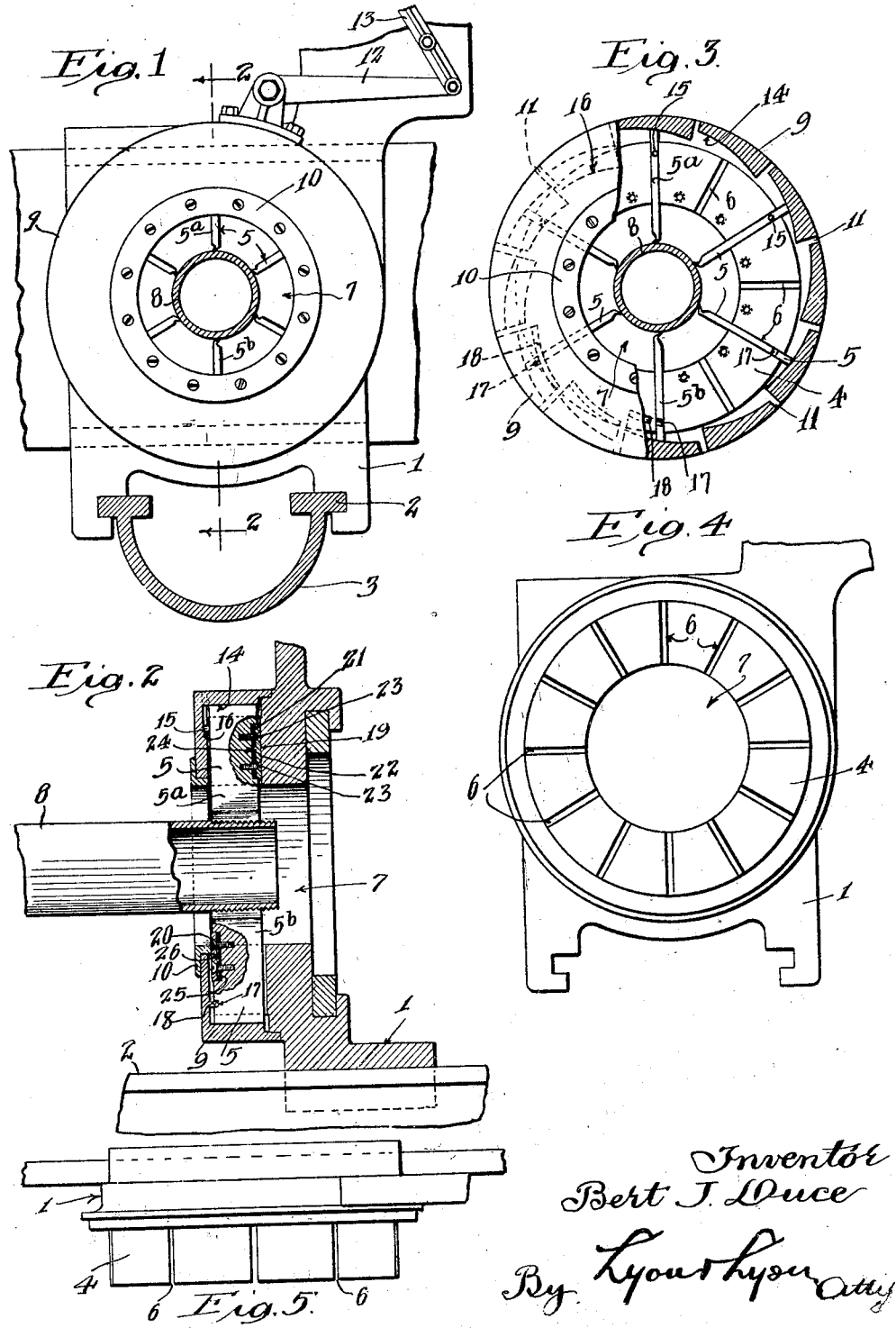
Inventor
Bert J. Duce
By Lyon & Lyon
Atty Patented June 17, 1924.

1,497,844

UNITED STATES PATENT OFFICE.

BERT J. DUCE, OF BUENA PARK, CALIFORNIA.

THREAD-CHASING MACHINE.

Application filed March 5, 1923. Serial No. 622,892.

*To all whom it may concern:*

Be it known that I, BERT J. DUCE, a citizen of the United States, residing at Buena Park, in the county of Orange and State of California, have invented a new and useful Thread-Chasing Machine, of which the following is a specification.

This invention relates to a thread chasing machine such as employed for cutting threads on rods or for cutting pipe threads. In their general construction these machines include a cutter head carrying a plurality of radially disposed dies or cutters, and the piece, such as a pipe, which is to be threaded is thrust into an opening in the head. A relative rotation between the pipe and the cutters enables the cutters to cut the metal and produce a thread. In a common type of machine the pipe is rotated and the cutter head is held stationary. In this type of cutter head means is provided for holding the cutters in a predetermined adjusted position radially and this determines the diameter of the thread, which the cutters will produce. The cutters are disposed so that the cutting point on the thread alternates as regards the cutters, around the head. In other words if a certain cutter is cutting on the left face of a thread which is being produced then the next adjacent cutters will be cutting on the opposite face of the same thread. The wear upon the cutters is very great and the life of the cutters is therefore comparatively short. The worn cutters must be discarded or redressed by a tool dresser to give their teeth the proper relative alinement. The general object of this invention is to provide simple means for overcoming the difficulty and to provide an organization of parts in the cutter head which will enable worn cutters to be used and properly alined with each other so that they may still be used for producing threads although they are considerably worn at their cutting edges.

Further objects of the invention will appear hereinafter.

The invention consists in the novel parts and combination of parts to be described hereinafter, all of which contribute to produce an efficient thread chasing machine.

A preferred embodiment of the invention is described in the following specification while the broad scope of the invention is pointed out in the appended claims.

In the drawing—

Figure 1 is an elevation showing the face plate of a thread chasing machine embodying my invention, the bed or guideway of the cutter head being shown in cross section, and other parts being broken away.

Fig. 2 is a vertical section through the cutter head taken on the line 2—2 of Figure 1.

Fig. 3 is a partial section and elevation of the face of the cutter head, particularly illustrating the means for holding the dies or cutters for adjusting the same to the required diameter.

Fig. 4 is a front elevation of the drum portion of the cutter head and particularly illustrating the guide ways for the dies.

Fig. 5 is a plan of the guide drum and contiguous parts illustrated in Figure 4.

In practicing my invention I provide a cutter head with a plurality of substantially radially disposed cutting dies which are guided in the head and have teeth at their inner ends for cutting the thread upon the pipe. This cutter head has an alining face adjacent the edges of the dies on one side and has an oppositely disposed alining face adjacent the opposite edges of the dies. These dies are in the form of plates with the cutter teeth formed at the inner end; the dies are also composed of two sets. I provide the dies with shims on their edges, and also with an alining plate corresponding to each die, together with means for attaching the alining plate to the die and against the shims. The dies corresponding to one set have their alining plates resting against one of the alining faces, and the dies of the other set have their alining plates resting against the oppositely disposed alining face. This enables the dies which are cutting on the right hand side of the threads to be alined from one of the alining faces, and all the dies that are cutting on the other side or face of the thread to be alined from the opposite face. Referring to the drawings, 1 represents the carriage of a thread chasing machine or a pipe cutter which may be mounted upon guide rails 2 forming part of the bed 3 of the machine. This carriage constitutes the body of the cutter head and on its forward face is formed into a forwardly projecting drum 4 having suitable means for guiding a plurality of cutting tools or dies 5. In the machine to which I have applied my improvement these dies 5 are guided in the drums simply by means of radial slots 6 formed in the drum (see Figure 4) and when the tools are in operation they project into the central opening 7 formed through this drum. This opening also allows the end of the pipe 8 to pass into the head as far as necessary during the threading operation.

The machine is provided with suitable means for adjusting up the cutters or dies 5 and for retaining them in the head. For this purpose the machine is provided with an adjusting cam member comprising a cylindrical shell or cam ring 9 which may be formed integrally with a disk portion 10. The cam ring 9 is provided with slots 11 which may aline with the ends of the slots 6 so as to permit the dies to be introduced through the ring into the interior of the head. The dies are adjusted inwardly by rotating the cam ring by means of a link 12 and lever 13 mounted on the carriage, see Figure 1, and corresponding to each die the inner face of the cam ring is provided with a cam face 14, see Figure 3.

The head also is provided with means for preventing the dies on the upper half of the head from sliding down into the opening 7 and is also provided with means for preventing the dies in the lower half of the head from falling out of their slots. For this purpose the dies which are located above the horizontal diameter of the head are each provided with a laterally projecting pin 15 on one edge, for example, the left edge or outer edge of the die, see Figure 2, and the inner face of the ring 9 of the cam member is provided with a cam shaped shoulder 16 which is engaged by this pin when the die is slipped into the slot. This shoulder will stop the die with its butt end in a position to be engaged by its corresponding cam face 14 when the cam member is rotated. The shoulder 16 also operates to prevent the cam from sliding inwardly and the profile of this cam shoulder is substantially "parallel" to the cam face.

The dies which are below the horizontal diameter are each provided with a transverse notch 17 in their edges, respectively, and the notch of each die is engaged by a cam rib 18, see Figure 2, which engages the notch and prevents the die from falling out. In other words the cam ribs 18 perform a function for the lower dies or cutters which is equivalent to that performed by the cam shoulder 16 for the upper dies.

The numeral 5 indicates the dies generally but these dies are of two sets, one set being represented by the numerals $5^a$ which are disposed alternately between the members of the other set indicated by the numerals $5^b$. It should be understood that the dies or cutters $5^a$ are so positioned that they will cut on one side of the thread which is being formed, for example, on the right side, while the dies $5^b$ are so alined as to their cutting points that they will cut on the left hand side of the thread, which is being cut. The right hand edges of the cutters $5^a$ are alined by means of an alining face 19 which is really the bottom of the slots 6 in the present instance. The cutters $5^b$ have their left hand edges alined by means of the inner face 20 of the disk 10 of the cam member.

In order to enable the cutters mounted in this way in the head to be used after they are considerably worn, I provide the set of cutters $5^a$ with a plurality of shims 21 on their edge which cooperates with the alining face 19 and these shims are clamped against the edge by means of an alining plate 22 and countersunk screw 23 which pass through it and through the shims into the body of the cutter. I prefer to mount the shims in a shallow notch 24 which may also operate as guides for the end faces of the alining plates 22. I provide the left hand edges of the dies $5^b$ with similar shims 25 which are held in place in the same way by being clamped under an alining plate 26, the face of which rests against the alining face 20 of the cam member. The shims which I employ are of any desired thickness, for example, one thousandth of an inch. By using the desired number of shims progressively around the cutter head on alternate cutters or dies, that is to say, dies of the same set, the teeth of the cutters may be progressively alined so that each cutter tooth will do its proper amount of work in cutting the thread and be properly alined for effectively carrying on the operation of cutting the thread. I adopt the same procedure as to the other set of cutters or dies $5^b$ and by means of these shims I can produce a very accurate adjustment of the two sets of cutters. In this way in spite of considerable wear on the cutting points of these cutters, I can adjust them so that very badly worn cutters can be used effectively. After the cutters have become too worn to be used further they can be redressed as to the threads but in this redressing it is immaterial what relation the thread points of the cutters have to the alining edges of the cutters because the use of my shims renders this unnecessary.

In the cutting operation the thrust exerted upon the set of cutters $5^a$ forces them against their alining face, while the thrust upon the set of cutters $5^b$ forces them against their alining face.

It is understood that the embodiment of the invention described herein is only one of the many embodiments this invention may take and I do not wish to be limited in the practice of my invention nor in my claims to the particular embodiment set forth.

I claim:

1. In a thread-chasing machine, the combination of a cutter head with a plurality of substantially radially disposed cutting dies guided in the head and having teeth at their inner ends for cutting a thread, said cutter head having an alining face adjacent the edges of the dies on one side, and having an oppositely disposed alining face adjacent the opposite edges of the dies, said dies being composed of two sets, the dies of one set having shims with an alining plate corresponding to each die with means for attaching the same to the die and against the shims and lying against one of said alining faces, the dies of the other set having a plurality of shims on their edges with an alining plate corresponding to each die with means for attaching the same to the die and against the shims and lying against the opposite alining face of the cutter head.

2. In a thread-chasing machine, the combination of a cutter head with a plurality of substantially radially disposed cutting dies guided in the head and having teeth at their inner ends for cutting a thread, said cutter head having an alining face adjacent the edges of the dies on one side, and having an oppositely disposed alining face adjacent the opposite edges of the dies, said dies being composed of two sets, the dies of one set having a recess in the edge adjacent one of said alining faces and the dies of the other set each having a recess in the edge adjacent to the other alining face, said dies having shims received in their recesses respectively, and an alining plate corresponding to each die with means for attaching the same to the die and against the shims, the outer faces of said alining plates engaging their corresponding alining face of the cutter head.

Signed at Buena Park, California, this 20th day of February, 1923.

BERT J. DUCE.